March 27, 1951 W. A. TYRRELL 2,546,840
WAVE GUIDE PHASE SHIFTER
Filed April 26, 1945 3 Sheets-Sheet 1
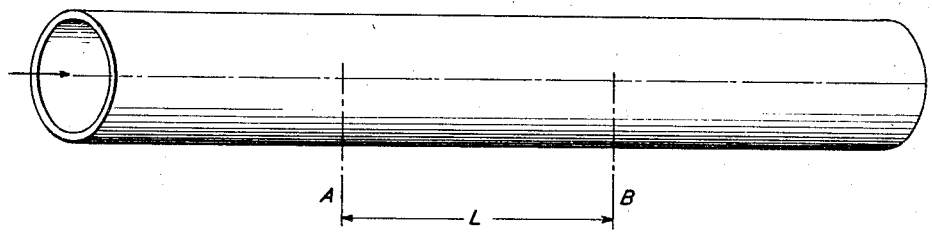
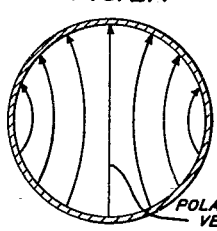
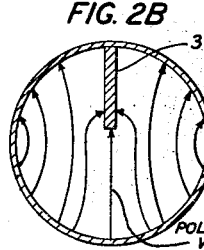
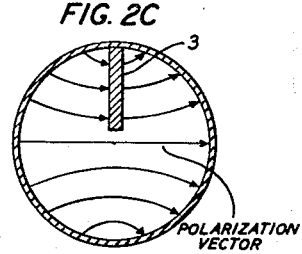
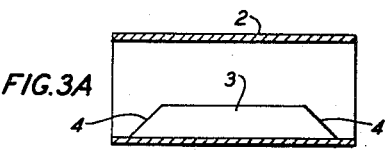
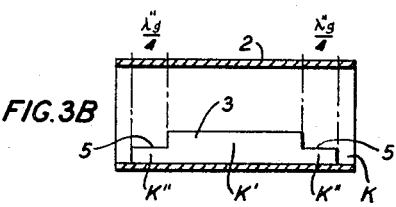
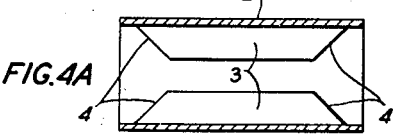
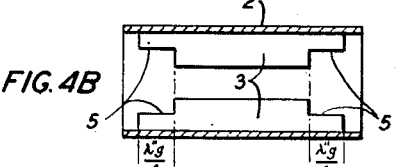
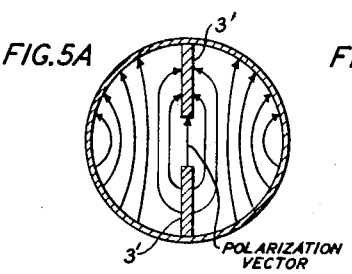
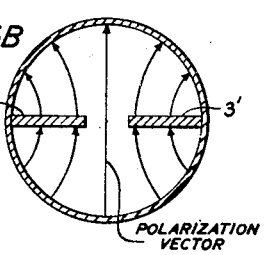
INVENTOR
W. A. TYRRELL
BY Charles Baroff
ATTORNEY INVENTOR
W. A. TYRRELL
BY Charles Baraff
ATTORNEY INVENTOR
W. A. TYRRELL
BY Charles Baroff
ATTORNEY Patented Mar. 27, 1951

2,546,840

UNITED STATES PATENT OFFICE 2,546,840

WAVE GUIDE PHASE SHIFTER

Warren A. Tyrrell, Fairhaven, N. J., assignor to Bell Telephone Laboratories, Incorporated, New York, N. Y., a corporation of New York Application April 26, 1945, Serial No. 590,365

1 Claim. (Cl. 178—44)

This invention relates to phase shifters, more particularly for use in connection with wave guides of the dielectric or metal sheathed type.

A principal object of the invention is the provision of a wave guide phase shifter, having the smooth broad band characteristics of a transmission line with distributed constants, in contradistinction to the sharper and more critical characteristics of resonant or lumped impedance circuits.

A further object of the invention is the provision of a wave guide phase shifter for concomitantly altering the phase velocity of waves, polarized in one direction therein, and leaving unaltered the phase velocity of waves polarized perpendicular to that direction.

A feature of the invention is the provision of a phase shifter, comprising a section of wave guide loaded by a radially extending fin or fins, longitudinally disposed along the guide periphery. The wave transmission characteristics will differ for mutually perpendicular orientations of linearly polarized waves, referred to the fin as a reference axis.

Another feature of the invention is the provision of a phase shifter, comprising a section of wave guide provided with one or more internal, radial fins, having impedance matching terminal portions.

Another object of the invention is to convert electromagnetic waves from one state of polarization into another by means of a phase shifter, which is reflectionless over a broad band of frequencies (1 per cent to 5 per cent).

A further object of the invention is the provision, in high voltage applications, of a phase shifter having impedance matching terminal portions designed to minimize corona discharge.

Other objects and advantages will be apparent from the specification taken in connection with the accompanying drawings wherein:

Fig. 1 shows a uniform section of guide for explanatory purposes;

Figs. 2A, 2B, 2C show electric force diagrams for different guides and polarizations;

Figs. 3A, 3B show single fin phase shifters in accordance with the invention;

Figs. 4A, 4B show phase shifters with two fins;

Figs. 5A, 5B show electric force diagrams therefor;

Figure 6:
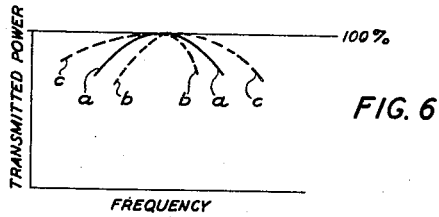
Fig. 6 shows explanatory curves in connection with the impedance matching terminal portions.

Phase shifters involving a section of wave guide provided with internal, diametral rods, properly spaced apart, have heretofore been proposed and disclosed in the United States Patents 2,433,119, patented March 23, 1948, by A. G. Fox, and 2,425,345, patented August 12, 1947, by D. H. Ring. The phase shifting action in these devices is developed essentially from the transmission properties of a single frequency or narrow band wave filter. A wave resonance set up between the phase shifting rods therein establishes a polarized filter-like structure, which acts differentially upon various orientations of linearly polarized, dominant waves.

The phase shifters, in accordance with the present invention overcome the limitations inherent in critical resonance or narrow band phase shifters, and are characterized by the broad band transmission characteristics of a uniformly loaded wave guide, such as is disclosed in United States Patent No. 2,199,083, issued April 30, 1940, to S. A. Schelkunoff. Characteristically, applicant's phase shifters may be viewed with respect to their broad band characteristics, as analogs of a matched, long transmission line with distributed constants, and may be operated uniformly over a band width of 1 per cent to 5 per cent. In the microwave region of 9,000 megacycles per second, for which specific construction in accordance with the invention have been made, a satisfactory performance is obtained over band widths of 90 to 450 megacycles per second.

In accordance with the invention, applicant's phase shifter comprises a section of wave guide, having a fin, longitudinally and peripherally connected thereto, to provide broad band characteristics, and also to alter the phase velocity of waves, polarized parallel thereto, while the phase velocity of waves perpendicular thereto is unchanged. The fin may be dimensioned and shaped to provide a predetermined phase shift, and more particularly, a 90 or 180 degree shift.

The phase shift section is matched to the main wave guide over a wide band of frequencies, by means of impedance matching terminal portions of tapered or reduced cross-section, formed on the fin, which portions may be rounded in high voltage applications to minimize corona discharges. Thereby, a simple, efficient and economical structure is provided, which will operate uniformly and effectively over a much wider band than heretofore contemplated.

The term "dominant wave", as used in this specification, denotes a wave corresponding to the particular mode, having the lowest possible cut-off frequency, capable of propagation in a pipe of predetermined cross-section.

The term "linear polarization" as applied to wave guides, denotes a state of the electromagnetic field, wherein the electric force vector at a particular point therein, executes as a function of time, simple harmonic motion on a straight line.

Similarly, the terms "circular" and "elliptical" polarization are characterized by the electric force vector, executing at any fixed point of the guide, a circular or elliptical sweep respectively as a function of time variation.

Analytically, an elliptically polarized wave may be compounded from two linearly polarized waves of the same frequency, whose axes of polarization are perpendicular and whose relative amplitudes and phases are different. Circular polarization then represents a special case of elliptical polarization, wherein the linearly polarized components are equal in amplitude, but differ 90 degrees in time phase.

General theory

Wave guides and the phenomena associated with the propagation of electromagnetic waves therein, have been fundamentally disclosed in the United States patents to G. C. Southworth, Nos. 2,129,711, 2,129,712, both issued September 13, 1938, to which reference is made.

The phase velocity of propagation of waves in an empty, hollow pipe wave guide is given by $$v = \frac{c}{\sqrt{1-\left(\frac{\lambda}{\lambda_c}\right)^2}} \quad (1)$$

where $c$ = the velocity of light in vacuo.
$\lambda$ = the wavelength in vacuo.
$\lambda_c$ = the critical or cut-off wavelength associated with the propagation of a particular wave mode and a particular cross-section of pipe.

From the formula, it is apparent that the phase velocity $v$ in a hollow pipe wave guide will always be greater than $c$ and that $v$ approaches $c$ as the wavelength $\lambda$ is made small relative to $\lambda_c$, the cut-off wavelength.

Referring to Fig. 1, which shows a wave guide pipe $l$ of uniform cross-section, assume that input waves of the dominant mode are applied thereto at the left and propagate in the direction of the indicated arrow.

At any given instant, the waves at any arbitrary cross-section A will have a certain phase $\Phi_A$, with respect to some fixed reference point in the guide. At the same instant, the phase at some other cross-section B, will correspondingly be $\Phi_B$.

The phase difference between A and B will then be expressed by the formula $$\Phi_B - \Phi_A = \frac{L}{\lambda_g} 360° = \frac{Lf}{v} 360° \quad (2)$$

where $\lambda_g$ = the wavelength within the guide, $f$ = the frequency of the wave oscillations.

From Equation 2, it is apparent that for a given frequency, the phase difference between two given points is dependent only upon the phase velocity $v$.

The introduction of a longitudinal fin or baffle into the circular guide, as shown in Figs. 2 and 3, results in an altered critical cut-off $\lambda_c'$ and phase velocity $v'$ respectively, as disclosed in the Schelkunoff patent 2,199,083, and functionally related together by the Equation 1.

Whereas a fin definitely alters the phase velocity and critical cut-off frequency for polarizations or orientations of field parallel thereto, it has no effect on the corresponding perpendicular polarizations. For such perpendicular polarizations, the baffle may be considered absent, and accordingly, $\lambda_c$ and $v$ for the empty circular guide (Fig. 1) will apply thereto in accordance with Equation 1.

Therefore, a guide section with longitudinal peripheral fin, may be considered to have two separate phase velocities, corresponding to waves polarized parallel and perpendicular to the plane of the fin respectively, illustrated in Figs. 2B, 2C, respectively.

The phase difference between points A and B for waves polarized parallel to the fin is $$\Phi_B' - \Phi_A' = \frac{Lf}{v'} 360° \quad (3)$$

whereas for the perpendicular polarization, Equation 2 applies.

The phase shift, i. e., the difference in phase between transmitted waves in the two orientations is given by $$\Phi = (\Phi_B' - \Phi_A') - (\Phi_B - \Phi_A) = Lf \cdot 360° \left(\frac{1}{v'} - \frac{1}{v}\right)$$

$$= L \cdot 360° \left(\frac{1}{\lambda_g'} - \frac{1}{\lambda_g}\right) \quad (4)$$

$$= \frac{L \cdot 360°}{\lambda} (\sqrt{1-v'^2} - \sqrt{1-v^2})$$

where, in conventional notation, $$v' = \frac{\lambda}{\lambda_c'}; \quad v = \frac{\lambda}{\lambda_c} \quad (5)$$

The term "phase shift," as used herein, therefore, denotes a difference in the electrical length of two transmission paths. In the instant phase shifter, these two paths are present within the same section of wave guide and result from introducing the analog of a transmission line with uniformly distributed loading therein, namely, a baffle, fin or the like, which affects differently the transmission of two sets of linearly polarized waves, whose axes of polarization are mutually perpendicular. Since any linearly polarized wave in general, may be resolved into two components, linearly polarized and mutually perpendicular, the phase shift therefor may be compounded from the shifts of its components. Two reference axes are established by the plane of the fin, namely, parallel and perpendicular thereto. Having chosen a particular structure to insert in the guide of Fig. 1, which determines a specific difference in phase velocities, any desired phase shift may be achieved by a suitable choice of its longitudinal length L. It is convenient, in fact, to characterize any given structure by the quantity $$\varphi = \frac{\Phi}{L} = \frac{360°}{\lambda} (\sqrt{1-v'^2} - \sqrt{1-v^2}) \quad (6)$$

where $\varphi$ is the phase shift per unit length of the structure. It may be noted that in many cases, there is an upper limit to $\varphi$, given by $$\varphi_{max} = \frac{360°}{\lambda}(1 - \sqrt{1-v^2}) \quad (7)$$

corresponding to the case in which the phase velocity for the one orientation approaches $c$ as a limit, i. e., the cut-off wavelength $\lambda_c$ is increased indefinitely and approaches $\infty$ as a limit.

Having proportioned a structure so as to obtain a certain desired phase shift at a particular operating wavelength, it is of interest to inquire how the phase shift changes as the operating wavelength is varied. From Equation 4 it may be shown that $$\frac{\Delta \Phi}{\Phi_0} = \frac{\Delta \lambda}{\lambda_0} \cdot \frac{1}{\sqrt{(1-v'^2)(1-v^2)}} \quad (8)$$

where $\Phi_0$ is the phase shift obtained at a wavelength $\lambda_0$, and where $\Delta \phi$ is the deviation in $\Phi_0$ occasioned by a wavelength change from $\lambda_0$ to $\lambda_0 + \Delta \lambda$. Equation 8 states that the percentage change in phase shift is equal to the percentage change in wavelength multiplied by a factor, always greater than unity, which depends upon the two phase velocities. It should be noted that the frequency variation of $\Phi$ is a function of L only insofar as the values of $v$ and $v'$ must be chosen to provide the desired phase shift in the available length.

In order to minimize the variation in phase shift with respect to frequency, the factors $(1-v'^2)$ and $(1-v^2)$ must be maximized; this may be done by making the former approach unity, whereupon $$\left(\frac{\Delta \Phi}{\Phi_0}\right)_{min} = \frac{\Delta \lambda}{\lambda_0} \cdot \frac{1}{\sqrt{1-v^2}} \quad (9)$$

so that, for maximum band width, the cross-sectional size of the pipe should be chosen as large as possible, and the length of the phase shifter should be made as great as possible. If this is done, one of the two phase velocities is only slightly greater than $c$, and the other is as near to $c$ as is compatible with the required phase shift in the given length. That is, the requirement for a given $\Phi$ in a given L defines a certain $\varphi$, and by choosing $\varphi$ in accordance with Equation 7, a value of $w$ will be obtained with which Equation 9 will yield the minimum variation in $\Phi$ with respect to wavelength change.

*Description of the invention*

The particular types of structure forming the basis of the present invention comprises one or more metallic plates, or fins, attached within the guide so as to possess both radial and longitudinal extent, as illustrated in Figs. 3A, 3B and Figs. 4A, 4B. Thereby, a pair of geometrical axes, mutually perpendicular, are set up within a guide, to which will correspond the aforementioned different transmission characteristics. The effect of these fins on wave transmission will accordingly depend upon their orientation with respect to the polarization of the waves. For simplicity, hereinafter, the discussion will be limited to the dominant wave.

Fig. 2A shows the approximate configuration of the electric lines of force in a uniform circular wave guide as set up by a linearly polarized wave. Fig. 2B shows qualitatively the electric force configuration, due to a metallic fin projecting radially into the guide, where the plane of the fin coincides with the direction of polarization as indicated, while Fig. 2C represents the lines of force, when the fin is perpendicular to the direction of polarization.

From the configurations in Fig. 2A and Fig. 2C, it should be evident that no appreciable alteration in the transmission characteristics occurs when the fin is perpendicular to the axis of linear polarization. Whereas, in the case of the fin, oriented parallel to the axis of polarization, a profound alteration occurs (compare Figs. 2A and 2B), resulting in marked differences for phase velocity, characteristic impedance, and other electrical properties. A fuller theoretical discussion of these differences may be found in the patent to S. A. Schelkunoff No. 2,199,083.

A similar alteration in transmission properties for parallel and perpendicular polarizations respectively, is manifested in the phase shift section, having two fins, illustrated specifically in Figs. 4A and 4B.

Thus, Fig. 5 shows qualitatively the disposition of the lines of electric intensity for a circular guide, having two diametrical metallic coplanar plates or fins, attached to opposite sides thereof. Fig. 5A shows how the transmission characteristics are altered when the direction of polarization is parallel to the plane of the fins and Fig. 5B shows how field distribution is essentially unaltered over Fig. 2A, when the polarization is perpendicular.

The structure of a phase shifter in accordance with the invention may take any of the forms shown in Figs. 3 and 4 respectively. The form depicted in Fig. 3A comprises a section of cylindrical guide 2, provided with an internal metallic plate or fin 3, extending radially thereof, and provided with impedance matching terminals 4, consisting of tapered extensions of 3. Fig. 3B shows a similar structure, in which the impedance matching terminals 5 are so proportioned, as to constitute quarter wavelength, impedance matching transformers. Figs. 4A and 4B are similar to Figs. 3A and 3B, respectively, differing only in that two diametral coplanar fins are used.

In general, there is no fundamental difference between phase shifters, with one fin and two fins. There is, however, a difference in the manner in which and extent to which the dominant wave in the main guide is distorted as it passes into the fin section. This can readily be inferred from Figs. 2A, 2B and 5A.

Thus, the field (Fig. 5A) in the vicinity of the terminal portions 4 or 5 of a double fin phase shifter is more symmetrical than in the single fin case (Fig. 2B). This means that the double fin terminal is fundamentally a smaller geometrical discontinuity, and therefore preferable, when good impedance matching is an important requirement of performance. Likewise, in some applications, described later, two or more phase shifters are arranged in series, to be rotated relative to each other (Fig. 10), and the symmetry in the adjacent field configurations, permits closer spacing of the phase shifters without mutual disturbance.

The phase shift sections may form an integral part of a main wave guide or may be inserted therein or connected thereto as rotatable sections thereof, as will appear hereinafter.

The manner of operation of these phase shifters may be inferred from the general discussion above, and will now be described with more particularity.

The projection of the fin into the guide section, for the parallel polarization case shown in Fig. 2B, acts to increase the cut-off wavelength, and according to Equation 1, decreases the phase velocity, relative to the values appropriate for Fig. 2A or 2C.

Let it be assumed that a linearly polarized, dominant wave is incident upon a phase shifter (Fig. 3 or 4). Let the angle between the axis of polarization and the plane of the fin be denoted by $\beta$. The incident wave may be regarded as the resultant of two linearly polarized components, in phase, whose axes of polarization are parallel and perpendicular, respectively, to the plane of the fin. Their relative amplitudes will be cos $\beta$ and sin $\beta$. The components will propagate through the phase shifter with differing phase velocities, the component parallel to the fin traveling slower. In their progress therethrough, the components acquire a phase difference, which increases with the distance of wave penetration into the phase shifter. The total phase shift developed between the two components will depend upon the depth and length of the fin or fins and, by proper proportioning of these dimensions, any desired phase shift may be secured. When the components emerge from the phase shifter, therefore, their resultant will in general have been transformed from a linearly polarized to an elliptically polarized wave. The analysis of this general case follows so closely the treatment of polarized waves in optics, that reference should be made to any standard textbook on the subject for further details.

There are two special cases, however, which are of special importance, namely, the 90-degree phase shifter and the 180-degree phase shifter. Thus, when a linearly polarized wave is incident upon a 90-degree phase shifter, having the plane of the fins at an angle $\beta$ of 45 degrees to the axis of polarization, the emerging wave will come out circularly polarized as explained in the United States patent to C. B. H. Feldman, No. 2,458,579. For other values of the angle $\beta$, the waves will in general emerge elliptically polarized.

The 180-degree phase shifter possesses the significant property that an incident, linearly polarized wave will emerge linearly polarized for all values of angle $\beta$. However, in general, a change in orientation of the polarization vector will result.

As previously stated, a longitudinal fin causes not only a change in phase velocity but also in characteristic impedance relative to the uniform wave guide section. An abrupt transition in impedance properties between the principal guide and the phase shift section would result in undesirable and disturbing reflections. To eliminate or to minimize such effects, terminal portions are provided on the fin for impedance matching. These terminal portions may be either tapered as illustrated in Figs. 3A and 4A, or reduced in crosssection over an electrical length capable of providing a quarter wave transformer action as shown in Figs. 3B and 4B. In the latter case, the characteristic impedance $K''$ of the quarter wave transformer terminal must be chosen so that $$K''=\sqrt{KK'} \qquad (10)$$

where $K$, and $K'$ are the characteristic impedances of the principal guide and main fin section. Correspondingly, it will be noted that the phase velocity $v$ and guide wavelength $\lambda_g$ for the transformer section will be intermediate in value between $v$, $\lambda_g$ and $v'$, $\lambda_g'$, associated with principal guide and main fin section, respectively. The length of the matching transformer terminal 5 will be $\lambda_g''/4$.

The quarter wave transformer provides perfect impedance matching at a given frequency. At adjacent frequencies, the transformer will not be a perfect match and reflections will arise. The reflections from the two terminations may be made to mutually cancel each other by a resonance effect, based on a suitable choice of the over-all length of the fin.

Fig. 6 illustrates how the impedance match may be made substantially perfect over a range of frequencies. Thus, curve $a$ shows qualitatively the transmission performance versus frequency for a single quarter-wave transformer termination. Curve $b$ shows the transmission performance for two such transformer terminations, spaced apart so that the reflections are additive. A comparison between curves $b$ and $a$ shows the relatively poorer performance for the additive effect. Curve $c$ shows the effect of spacing the terminations so that the reflections mutually cancel out. In this case, it will be observed how the curve shows a better approach to 100 per cent performance over a wider range of frequencies.

Heretofore, it has been assumed that the thickness of the fin is negligible, particularly where the electric intensity was perpendicular to the plane of the fin. However, in actual practice, thickness may be necessary for mechanical advantages. Here, undesirable "edge reflections," of the perpendicular component may likewise be eliminated by choosing an over-all length of fin, whereby the effects from each end of the fin may mutually cancel at the operating frequency.

The case in which the terminal portions are tapered presents several points of difference from the quarter wave transformer. For a fixed choice of main fin section 3, the design of the appropriate quarter wave transformer 5 is essentially unique. On the other hand, the tapered terminal 4 may be varied both in length and in shape over a wide range. It is well known that the use of a tapered line will not result in a perfect match for any frequency, although the match becomes nearly perfect as the length of the taper is indefinitely increased. In general, a very short taper does not compare favorably with the quarter wave transformer. Thus, when compactness of structure is of importance, the quarter wave transformer is to be preferred. However, when available space is not limited, a long taper may be superior, inasmuch as it will yield a nearly perfect match over a very wide frequency band. In actual practice, it appears that the taper should be several wavelengths in over-all dimension in order to realize this advantage. Since the theoretical analysis of tapered lines is quite complicated, it may often be preferable to achieve a satisfactory engineering solution by experiment. Also, a tapered fin whose edge is straight is often to be preferred, although an improved match may be obtained from a curved terminal portion.

It should be noted that the tapered terminal portions not only improve the impedance matching for the parallel component, but also minimize the "edge reflections" for the perpendicular component.

Figure 7A:
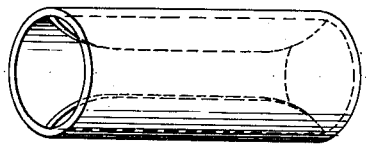
Figs. 7A and 7B show phase shifters modified for high voltage use.
Figure 7B:
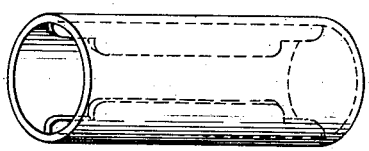

In high voltage applications, undesirable corona discharges may take place at the sharp corners of fins of the types shown in Figs. 3 and 4. To prevent such discharges, the corners may be rounded, both for the tapered and the quarter wave transformer terminal portions, as shown in Figs. 7A and 7B.

In the construction of practical phase shifters in accordance with the invention, certain mechanical and electrical requirements will normally be present. Referring to the general theory previously outlined, it is apparent that the dependence of phase shift upon frequency is minimized, if the phase shifter is made as long as possible, with correspondingly shallow fins. This condition is also favorable to an improved impedance match, as the impedances $K$ and $K'$ thus differ only slightly. When space permits, therefore, phase shifter design is optimized by the use of long, shallow fins with correspondingly shallow terminal portions. The pipe size may also be increased to a practical limit, in accordance with Equation 9. Here the term "optimum design" is used to denote the securing of a condition in which both phase shift and impedance match are the least critical functions of frequency; this also implies, however, that the principal dimensions of the phase shifter may be given maximum tolerances.

For applications in which the available space is severely curtailed, the usable band width and physical tolerances will be somewhat decreased. In this case, optimum design calls for fin proportioning so as to cancel reflections from the two ends both for the transformer reflections incidental to the parallel component and for the edge reflections of the perpendicular component, insofar as this simultaneous cancellation is compatible with the phase shift desired.

Figure 8A:
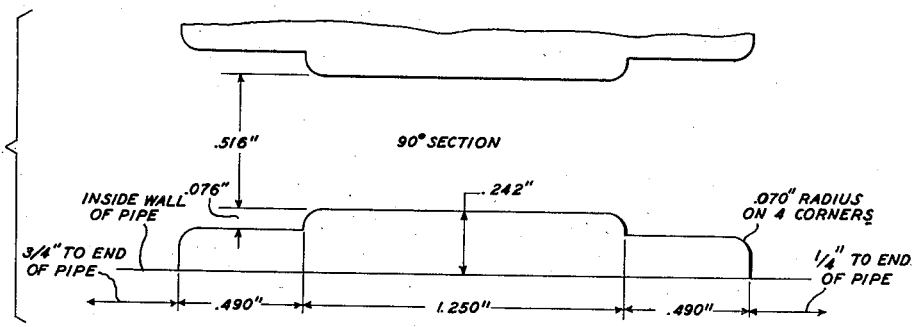
Figs. 8A and 8B show some practical embodiments of the fin.
Figure 8B:
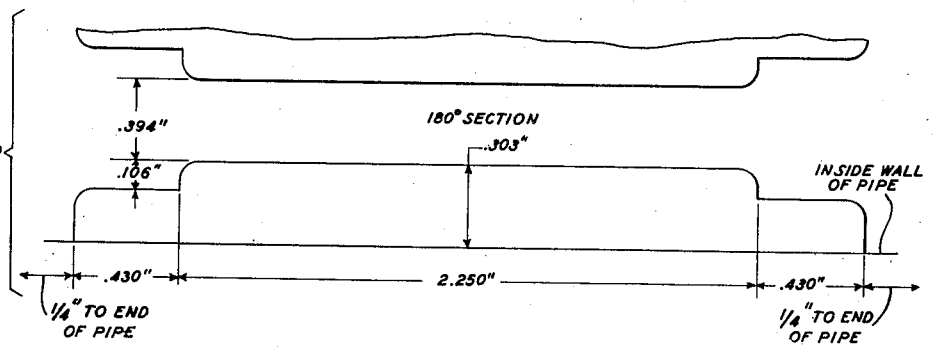

Figs. 8A and 8B show the actual dimensioning of 90-degree and 180-degree phase shifters, constructed in accordance with the invention, for applications in which the over-all length of the structures was highly restricted. These phase shifters were designed for use at wavelengths in the vicinity of 3.40 centimeters, and were found satisfactory both in phase shift and impedance match over a 3 per cent frequency band, even with several units arranged in series. Cancellation of end reflections is realized in these practical examples for both parallel and perpendicular components.

In present practice, the proportioning of suitable fins to realize specified phase shifts in an appropriate size and shape of wave guide is carried out largely on an empirical or experimental basis.

Figure 9:
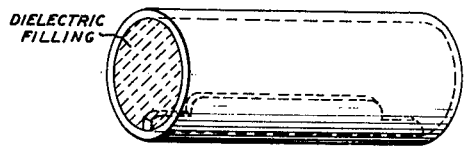
Fig. 9 shows a phase shifter section with dielectric filling.

Fig. 9 shows a modification of the phase shift section, wherein a filling of dielectric material, such as wax, paraffin, polystyrene, etc. is employed, for attaining greater compactness. The dielectric filling shortens the length L of the phase shift section over the corresponding air-filled form of Fig. 3.

*Applications of the phase shifters*

Figure 10A:
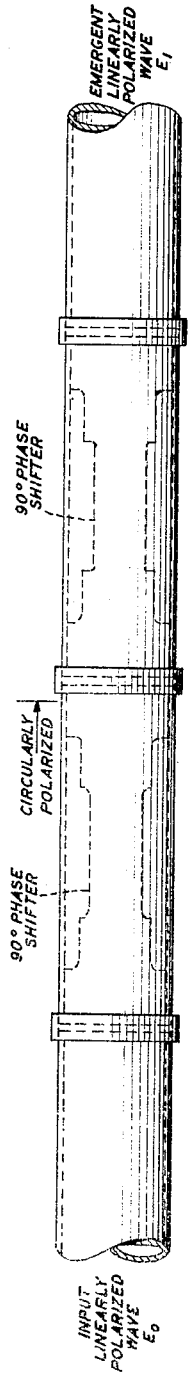
Figs. 10A, 10B and 10C show applications of the phase shifters to rotating structures in wave guides.

These phase shifters may be utilized in wave guide systems having rotating joints in various ways, disclosed in the aforementioned Fox application. Fig. 10 illustrates some examples of such applications. Thus Fig. 10A represents a wave guide having a pair of 90-degree phase shift sections, attached thereto and rotatable with respect to each other. By rotating the sections to the position where $\beta=45°$ ($\beta=$angle between $E_0$ and fin), a linearly polarized dominant wave will emerge as a circularly polarized dominant wave from the first 90-degree section, and then be reconverted by the second section, and emerge as a linearly polarized outgoing wave. The details are explained more fully with vector diagrams in the Feldman application to which reference has been made.

Figure 10B:
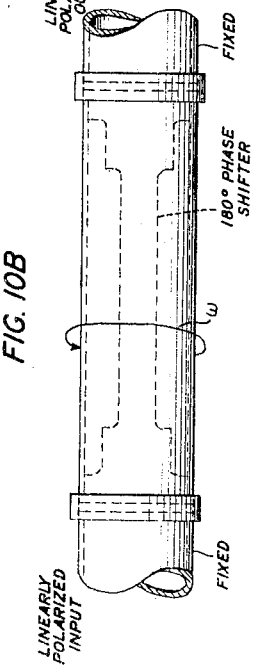

Another application of the phase shifters is to provide a polarization rotator in a wave guide as illustrated in Fig. 10B. If the 180-degree phase shift section shown is rotated at an angular speed $\omega$, the polarization of the outgoing wave rotates at an angular speed of $2\omega$.

Figure 11:
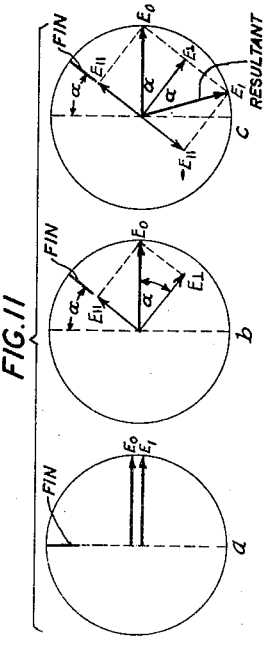
Fig. 11, diagrams $a$, $b$ and $c$ are explanatory vector diagrams.

Such a performance of the 180-degree section may be better comprehended with the aid of the vector diagrams of Fig. 11. Denoting the input, linearly polarized wave by vector $E_0$ and the emergent vector by $E_1$, it may be seen from sketch 11a, that if $E_0$ is at right angles to the fin, there is no phase change. Now, assume that the fin is rotated through an angle $a$, $E_0$ may then be resolved into two components $E_\parallel$ and $E_\perp$, respectively, parallel and perpendicular to the fin, as illustrated on sketch 11b. The 180-degree phase shift section acts to produce a shift of 180 degrees in the component $E_\parallel$ relative to the unaffected component $E_\perp$. This is equivalent to reversing the parallel component, which becomes $-E_\parallel$ as shown in sketch 11C. The resultant of $E_\perp$ and $-E_\parallel$ is indicated as $E_1$, the emergent vector, which has been rotated through an angle $2a$, with respect to $E_0$.

From this, it will be apparent that if the 180-degree section is rotated at an angular speed $\omega$, the polarization of the outgoing wave rotates at an angular speed $2\omega$. The instantaneous position of the electric vector in a circularly polarized wave will be similarly rotated by the 180-degree phase shift section.

Figure 10C:
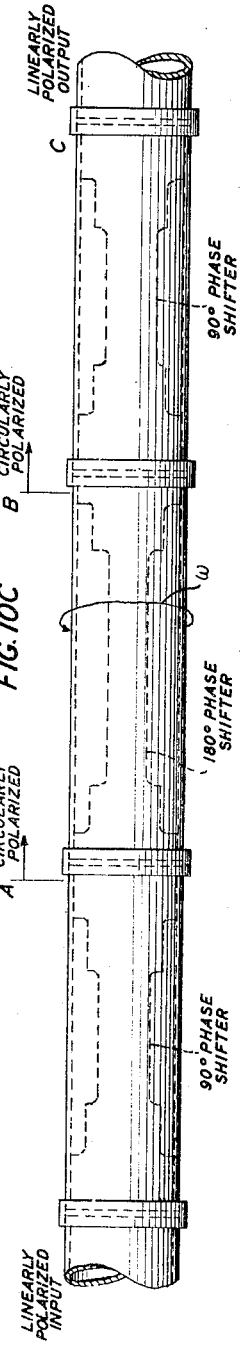

Another application is shown in Fig. 10C. Here a linearly polarized input wave is made to pass through a sequence of three phase shifters, the two shifters at the ends being 90-degree phase shift sections, while the intermediate unit is a 180-degree phase shift section. As explained in the United States Patent of A. G. Fox, No. 2,438,119, patented March 23, 1948, this arrangement may be used to change the phase of the output waves relative to the phase which would exist at some point in the output end in the absence of the sequence of phase shifting sections.

While the invention has been illustrated in specific forms for the purpose of disclosure, it will be apparent that modifications thereof or therein may be made by persons skilled in the art without departing from the purpose and scope of the invention.

What is claimed is:

A phase shifter comprising a non-radiating cylindrical section of wave guide, coplanar longitudinal conductive fins connected internally to the periphery thereof and provided with impedance matching terminals at opposite ends thereon, said fins being symmetrically disposed and on opposite sides with respect to the principal axis of said section, the length of said fins being proportioned to provide a predetermined phase shift.

WARREN A. TYRRELL.

REFERENCES CITED

The following references are of record in the file of this patent:

UNITED STATES PATENTS

| Number | Name | Date |
| --- | --- | --- |
| 2,180,950 | Bowen | Nov. 21, 1939 |
| 2,199,083 | Schelkunoff | Apr. 30, 1940 |
| 2,207,845 | Wolff | July 16, 1940 |
| 2,317,503 | Usselman | Apr. 27, 1943 |
| 2,411,534 | Fox | Nov. 26, 1946 |
| 2,422,058 | Whinnery | June 10, 1947 |
| 2,425,345 | Ring | Aug. 12, 1947 |
| 2,427,100 | Kihn | Sept. 9, 1947 |
| 2,430,130 | Linder | Nov. 4, 1947 |
| 2,433,368 | Johnson | Dec. 30, 1947 |
| 2,438,119 | Fox | Mar. 23, 1948 |
| 2,464,269 | Smith | Mar. 15, 1949 |
| 2,479,650 | Tiley | Aug. 23, 1949 |